K. C. NAYLOR.
NUT LOCK.

No. 181,589. Patented Aug. 29, 1876.

Witnesses:
P. C. Dieterich.
F. H. Duffy.

Inventor:
Kinzey C. Naylor.
Per: C. H. Watson & Co. Attorneys.

UNITED STATES PATENT OFFICE.

KINZEY C. NAYLOR, OF NEW SHARON, IOWA.

IMPROVEMENT IN NUT-LOCKS.

Specification forming part of Letters Patent No. 181,589, dated August 29, 1876; application filed August 8, 1876.

*To all whom it may concern:*

Be it known that I, KINZEY C. NAYLOR, of New Sharon, in the county of Mahaska and State of Iowa, have invented certain new and useful Improvements in a Lock-Nut; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a lock-nut, as will be hereinafter more fully set forth.

Figure 1:
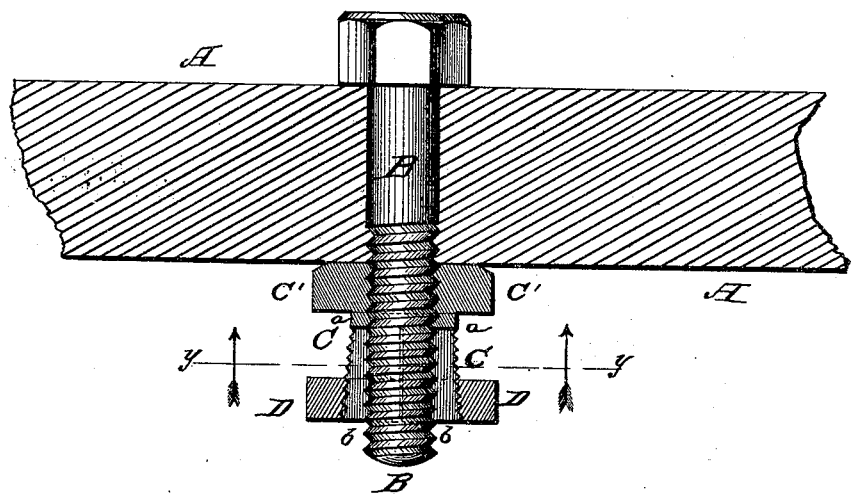
Figure 2:
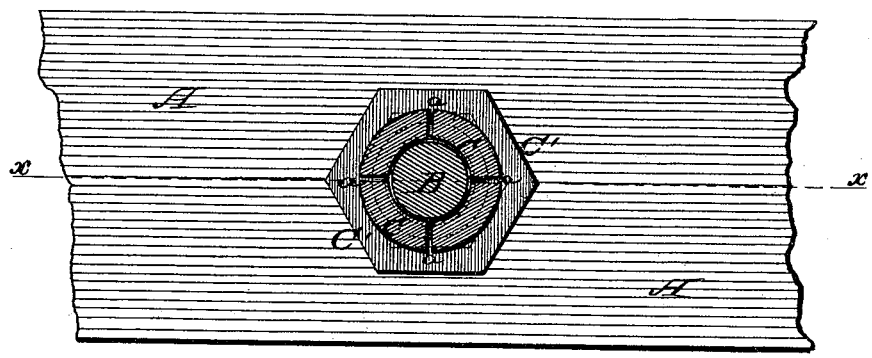
Figure 3:
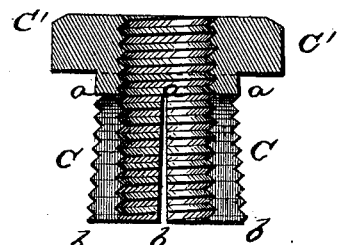

In the annexed drawing, Figure 1 is a section through the line $x\ x$ of Fig. 2, showing the application of my invention. Fig. 2 is a cross-section through the line $y\ y$, Fig. 1. Fig. 3 is a longitudinal section of the nut proper.

A represents simply a piece of timber through which an ordinary bolt, B, is passed. C represents an elongated nut to be screwed on the bolt B. This nut is, at its inner end, formed with a polygonal-sided flange, C′, for the application of a wrench to turn the nut. The main part of the nut from $a$ to $b$ is split longitudinally to form, as it were, two or more jaws. This part of the nut is made tapering on the outside, increasing in diameter from the flange C′ to the outer end of the nut, and provided with exterior screw-threads. On this part of the elongated nut is screwed an ordinary nut, D.

In the application of this invention, the nut D is first run up close to the flange C′, and the nut C is then tightened or screwed up in the usual manner. The exterior screw-threads on the body of the nut C are made in the opposite direction from that of the interior threads. The nut D is then run outward on the split nut, and this being tapering the parts or jaws thereof are clamped on the bolt in such a manner that it is impossible for the nut C to turn thereon.

The threads of the nut C running in opposite directions, tends to still further security in locking the nut.

Having thus fully described my invention, what I claim as new, and desire to secure by Letters Patent, is—

The elongated split nut C, provided with the flange C′, and with exterior screw-threads running in opposite direction to the interior threads, and made tapering, as described, in combination with the nut D screwed thereon, substantially as and for the purposes herein set forth.

In testimony that I claim the foregoing as my own I affix my signature in presence of two witnesses.

KINZEY C. NAYLOR.

Witnesses:
 PIERCE RATLIFF,
 ANNIE M. KING.